(12) United States Patent
Rim

(10) Patent No.: US 6,202,143 B1
(45) Date of Patent: Mar. 13, 2001

(54) SYSTEM FOR FETCHING UNIT INSTRUCTIONS AND MULTI INSTRUCTIONS FROM MEMORIES OF DIFFERENT BIT WIDTHS AND CONVERTING UNIT INSTRUCTIONS TO MULTI INSTRUCTIONS BY ADDING NOP INSTRUCTIONS

(75) Inventor: Min-Joong Rim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/135,550

(22) Filed: Aug. 18, 1998

(30) Foreign Application Priority Data

Aug. 21, 1997 (KR) .................................. 97-39768
Sep. 3, 1997 (KR) .................................. 97-45595
Jun. 18, 1998 (KR) .................................. 98-23009

(51) Int. Cl.$^7$ .................................................. G06F 15/00
(52) U.S. Cl. ........................... 712/210; 712/35; 712/205; 711/170; 711/171; 711/172; 711/173; 710/107
(58) Field of Search ..................... 710/107; 711/167, 711/170–173; 712/35, 247, 205, 210

(56) References Cited

U.S. PATENT DOCUMENTS

| | | | |
|---|---|---|---|
| 4,812,970 | * | 3/1989 | Kitamura et al. ................. 712/247 |
| 4,958,276 | * | 9/1990 | Kiuchi et al. ..................... 711/167 |
| 5,588,124 | * | 12/1996 | Hongo ............................... 710/107 |
| 5,630,099 | * | 5/1997 | MacDonald et al. ............. 711/172 |
| 5,737,767 | * | 4/1998 | Agrawal et al. .................. 711/171 |
| 5,867,726 | * | 2/1999 | Ohsuga et al. ................. 395/800.32 |
| 5,911,082 | * | 6/1999 | Monroe et al. .................... 712/35 |

* cited by examiner

Primary Examiner—Meng-Ai T. An
Assistant Examiner—Nabil El-Hady
(74) Attorney, Agent, or Firm—Jones Volentine, L.L.C.

(57) ABSTRACT

A data processing system for processing digital data comprises a first program bus for transferring a unit instruction, a second program bus for transferring a multi instruction consisting of unit instructions, a first program memory connected with said first program bus for storing the unit instruction, a second program memory connected with the second program bus for storing the multi instruction, and a process core for executing the unit or multi instruction fetched. The first and second program memories preferably have different bits widths. The process core includes an instruction input interface circuit for adding NOP instructions to a unit instruction fetched from the first program memory so as to form a multi instruction. The instruction input interface circuit preferably comprises an instruction converter for converting the unit instruction to the multi instruction by adding said NOP instructions, and an instruction selector for selecting the multi instruction generated from the instruction converter or another multi instruction fetched from the second program memory.

9 Claims, 17 Drawing Sheets

Fig. 9

| INSTRUCTION BITS WIDTH | ADDR[0:2] | VALID[0:3] |
|---|---|---|
| 16 | 000 | 0001 |
| | 010 | 0001 |
| | 100 | 0001 |
| | 110 | 0001 |
| 32 | 000 | 0011 |
| | 010 | 0001 |
| | 100 | 0011 |
| | 110 | 0001 |
| 64 | 000 | 1111 |
| | 010 | 0111 |
| | 100 | 0011 |
| | 110 | 0001 |

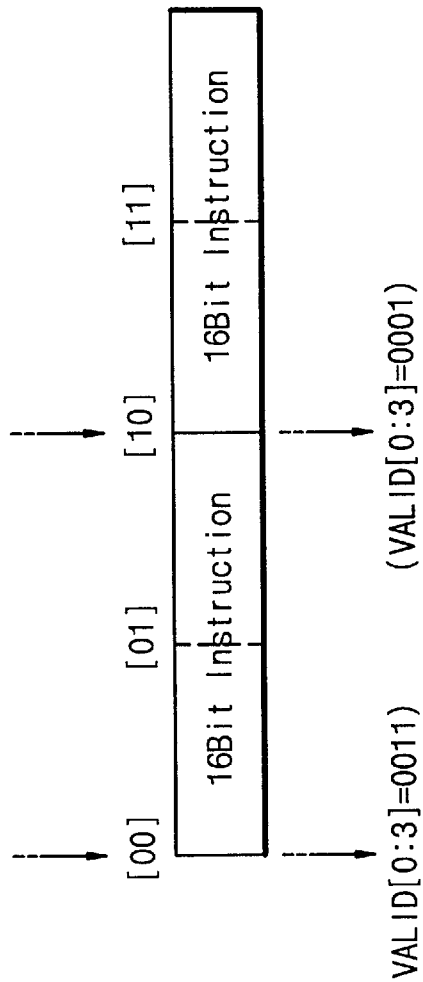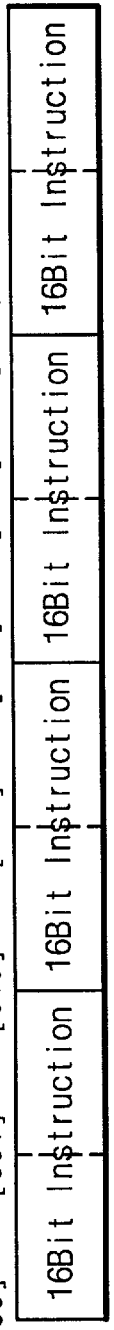

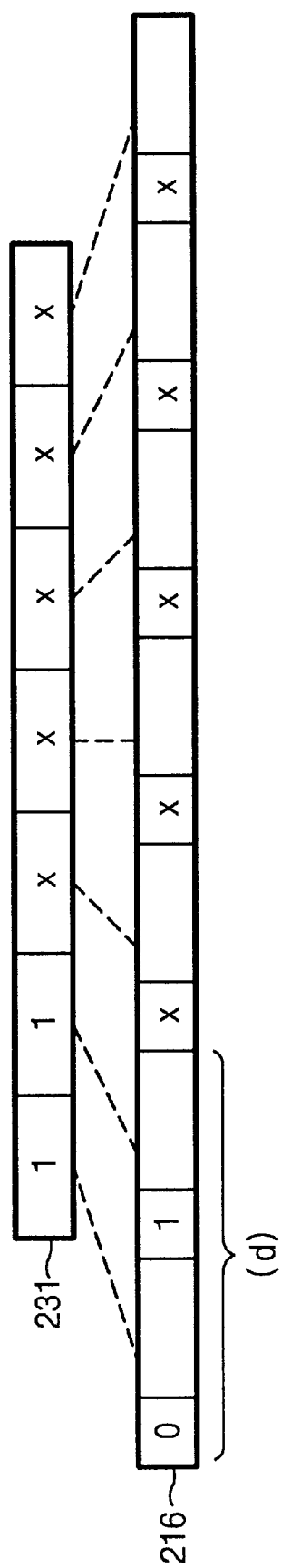

SYSTEM FOR FETCHING UNIT INSTRUCTIONS AND MULTI INSTRUCTIONS FROM MEMORIES OF DIFFERENT BIT WIDTHS AND CONVERTING UNIT INSTRUCTIONS TO MULTI INSTRUCTIONS BY ADDING NOP INSTRUCTIONS

FIELD OF THE INVENTION

The present invention concerns a data processing system, and more particularly a data processing system for accessing a program memory storing instruction sets of various bit widths, and a method of operating it.

BACKGROUND OF THE INVENTION

Recently, semiconductor fabrication technology has made it possible to achieve a semiconductor chip with complex functions, which includes various circuits constituting an electronic system on the single chip to considerably reduce the system size. Namely, the various independent devices constituting the control circuits of a computer system conventionally have been mounted on the main board, but the recently developed technology makes it possible to obtain the various control devices as a single chip, so that the size of the whole circuits may be reduced, and thus the size of the electronic system. This in addition reduces the production cost together with the operating power consumption. Moreover, such development of the semiconductor fabrication technology has affected the micro controller unit (MCU) and digital signal processor (DSP).

It has been generally known in this art that a DSP is suitable for a signal processing program to execute repeated computations, and a MCU for a control program. However, there frequently occurs a case in which a single information-handling task is composed of control parts and computational parts (especially repeated computations), and to use both a DSP and a MCU complicates handling of such a task. For example, one problem is to employ two different instructions, complicating the mutual interface such as data exchange. Another problem is that the development environment is complicated due to the two instruction streams to make the program debugging difficult. A third problem is that the synchronization between DSP and MCU is not easy. And another problem is an increase in the circuit size. In order to cope with these problems, the orthogonal instruction of the RISC (Reduced Instruction Set Computer) type may be used to achieve good compilation.

DSPs and MCUs have different structural characteristics. A DSP is designed to suit the algorithm to process a voice signal, an audio signal, etc. at high speed, thereby having a very irregular hardware structure and non-orthogonal instruction set. This makes it very difficult to develop a high performance compiler to compile programs for DSP. For most of the cases, the application programs for DSP are usually developed by using an assembler.

Application of DSP suffers poor locality of data owing to continuous input and output of data, compared to application of MCU, so that it is difficult for DSP to have the memory hierarchy consisting of register, cache, virtual memory, etc. The architecture of a DSP is generally based on the memory rather than the register, employing the so-called Harvard Architecture that the program memory and data memory are separated from each other to have respective program bus and data bus in order to facilitate data access.

A DSP designed for implementing a filter frequently performs multiplying operations using two operands, and therefore employs the modified Harvard architecture using the program memory bus as the data memory bus, or two data memory buses. Such a DSP employs the general purpose registers less than an MCU, but employs special purpose registers to facilitate special data process.

If there occurs an overflow in an MCU, a trap is usually generated. However, a DSP is provided with a guard bit to prevent the overflow or to become saturated without delay when there occurs an overflow.

A DSP has no cache, or otherwise has a cache structured in a manner different from an MCU. The reason is that the execution time varies with the cache hit rate. For the same reason, a page miss of the virtual memory hardly allows the memory abort in DSP. Further, a DSP is used in the application of digital signal processing, thus having many special instructions suitable therefor, while an MCU has versatility.

A 16 bit DSP has instructions of various lengths such as the basic 16 bit instruction, 32 bit instruction, and 36 to 40 bit instruction containing the guard bit, and particularly an ALU (Arithmetic Logic Unit) instruction for high speed operation to simultaneously execute both an ALU operation and multiplication, and instructions for barrel shift.

A DSP is structured to fetch two operands in a single cycle for data access, simultaneously executing both ALU operation and loading/storing data into the memory. Its hardware has a repeated loop function to support the repeated operation together with modulo addressing function. Thus, a DSP instruction may perform multiple operations in a single cycle, achieving high speed digital signal processing.

On the other hand, a 32 MCU is based on 32 bit data, performing data access operations in bytes. It employs the orthogonal instruction set using many general purpose registers to support the compiler. For example, it supports the branch instruction, relative addressing, index addressing, bit manipulation, etc. Further, it strongly supports interrupts, traps, etc. exceptionally occurring.

As described above, DSPs and MCUs have respectively inherent characteristics to support corresponding applications. These are especially applied in the form of a single chip embedded with core, memory and peripheral equipment. Electronic systems such as cellular phones, video cameras, multi media systems, etc. are equipped with both processors. A DSP is used to process digital signals such as voice signals in the cellular phone and audio and video signals in the video camera. Thus, both processors serve respective functions. Recently, 16 bit fixed point DSP and 32 bit MCU have become widely used in various electronic systems.

The complicated multi functional electronic systems developed recently should have to do with many data, especially processing data in real time, so that the general purpose MCU for control needs many repeated computations, and the DSP for processing signals also needs the control function. Namely, the situation requiring processing of greatly increased data in a short time and performing of corresponding control functions requires that a DSP have such control function as in an MCU, and an MCU have such high speed data operational function as in a DSP.

As the DSP application program increases its size to include a control program together with the program of data signal processing, it becomes difficult to develop it with an assembler. Moreover, it is important for the application program to be properly provided for the rapidly developing related technology. In this respect, a high level program language may be a proper means to facilitate the development of the application program for DSP, and the architecture of DSP must necessarily be changed so as to reduce the size of the codes generated by compiling the application program.

Meanwhile, the fact that the MCU needs the instructions required for performing such data processing function as in a DSP, and the DSP the instructions required for such control function as in an MCU blurs the boundary dividing a DSP and an MCU. Recently, studies have been made to integrate the two processors in a single chip, resulting in a unified processor integrating both MCU and DSP. Such unified processors are generally divided as follows:

One approach is to make a processor provided with both MCU instructions and DSP instructions. This may again be achieved by several ways. The first way is to add a coprocessor to an MCU so that the coprocessor may perform DSP instructions. The second is to design the MCU instruction to include the DSP instruction. The third is to design the DSP instruction to have enough orthogonal characteristics to partake with the MCU instructions. Though these ways provide a single chip processor having both DSP and MCU functions, the problem is that the processor is achieved by using two separate instruction sets. When the MCU and DSP instructions are not properly unified through the coprocessor, it is hard to determine whether the MCU or DSP instruction may be used when preparing the codes that belong to the intermediate zone between MCU and DSP. In addition, the existence of both MCU and DSP instructions increases the number of instructions, so that it becomes difficult for the compiler to effectively compile all of the instructions. Especially, it is important to use an instruction with a small bit-width for the program size stored into the embedded memory of the processor. However, it is hard to minimize the code size with the small bit-width instruction because of many kinds of the instructions contained in both DSP and MCU instruction sets. Moreover, the separate DSP and MCU instructions make it difficult to effectively use the resources of the processor. Namely, both the resources for DSP and MCU are not commonly occupied and wasted.

Secondly, a processor may be made using the superscalar method to perform multiple instructions in a single cycle, or the VLIW (Very Long Instruction Word) method. In the ordinary MCU instruction, there are many cases where the program code size is reduced to improve the performance. But, in case of a DSP, it is more effective that the instructions contained in the repeated loop are optimized instead of reducing the code size to improve the performance, for the DSP program usually contains many repeated loops, which are only parts of the overall code of the program but take a considerable part of the execution time. In a DSP, a considerable part of the instructions is allocated for the instructions frequently used in such loop as MAC (multiplication and accumulation). The MAC instruction is designed to execute an addition, a multiplication and two data loadings. Such instructions to improve the performance of DSP may correspond with a combination of several simple MCU instructions in many cases. In connection with an MCU, the instruction constituting a large part of the code need be more effectively designed to simply reduce the code size, but a DSP may be improved in performance by increasing the instructions to execute several operations in a single cycle. Considering both of these cases, the instruction set may be designed to execute several instructions in a single cycle with such simple instructions as a RISC, which both reduces the program code size of an MCU and improves the performance of a DSP. This leads to another kind of unified processor achieved by applying the superscalar or VLIW method.

The superscalar method is to schedule by means of hardware (processor) what instructions would be simultaneously executed and in what order the instructions are executed. The processor according to this method is programed as an MCU, so that at least four instructions must be executed at once in order to achieve the performance of a DSP with the MCU instructions. Scheduling this, the hardware suffers a very large overhead, so that the processor is hardly achieved with low cost and low power consumption.

The VLIW method has no such drawbacks as the previous method because the scheduling is made by the compiler, so that a small hardware may execute several instructions at once. However, the VLIW instruction has non-scheduled portions containing NOP (No-OPeration) instructions, increasing the code size and thus the bit-width of the program memory. Hence, where the program memory is not included in the processor chip, an external memory bus must be constructed with a large bit-width, increasing the production cost.

Besides all such problems accompanying the design of the unified processor by using the conventional methods, there occurs a problem owing to the structural difference between the data buses of a DSP and an MCU. Generally, an MCU is suitable for applications requiring many real-time computations and controls because it has a large memory region and performs 32 bit integer operation. However, it is sufficient for DSP to make 16 bit fixed point operation. This is the reason that DSP with a 16 bit bus width is unified with an MCU with 32 bit bus width to achieve the unified processor. In this case, the final bus width is constructed to accommodate 32 bits, so that DSP uses only 16 bits of the 32 bit bus, wasting the remaining resources.

SUMMARY OF THE INVENTION

It is an object of the present invention to provide a data processing system which has an effective structure of instructions to accommodate both functions of digital signal processing and controlling.

According to an aspect of the present invention, a data processing system for processing digital data comprises a first program bus for transferring a unit instruction, a second program bus for transferring a multi instruction consisting of unit instructions, a first program memory connected with said first program bus for storing the unit instruction, a second program memory connected with the second program bus for storing the multi instruction, and a process core for executing the unit or multi instruction fetched. The first and second program memories preferably have different bit-widths. The process core includes an instruction input interface circuit for adding NOP instructions to a unit instruction fetched from the first program memory so as to form a multi instruction. The instruction input interface circuit preferably comprises an instruction converter for converting the unit instruction to the multi instruction by adding said NOP instructions, and an instruction selector for selecting the multi instruction generated from the instruction converter or another multi instruction fetched from the second program memory.

According to another aspect of the present invention, a data processor having an embedded memory comprises in a single chip a first program bus for transferring a unit instruction, a second program bus for transferring a multi instruction consisting of two or more unit instructions, an internal program memory connected with the second program bus for storing the multi instruction, and a processor core for executing the unit or multi instruction fetched. An external program memory for storing the unit instruction may be connected with the first program bus. The external and internal program memories have different bit-widths. The process core preferably includes an instruction input interface circuit for adding NOP instructions to a unit instruction fetched from the external program memory so as to form a multi instruction. Preferably, the instruction input interface circuit comprises an instruction converter for converting the unit instruction to the multi instruction by adding the NOP instructions, and an instruction selector for selecting the multi instruction generated from the instruction converter or another multi instruction fetched from the internal program memory.

According to still another aspect of the present invention, there is provided an instruction conversion method for a data processing system, which includes a unit instruction program memory for storing a unit instruction and a multi instruction program memory for storing a multi instruction consisting of two or more unit instructions, the program memories having different bit-widths, and a processor core for executing the unit instruction fetched from the unit instruction program memory or the multi instruction fetched from the multi instruction program memory. The conversion method comprises: fetching the unit or multi instruction; deciding whether the fetched instruction is a unit or multi instruction; converting the fetched unit instruction to a multi instruction; and inputting the multi instruction converted from the unit instruction, or fetched from the multi instruction program memory, to the processor core. Preferably, converting the fetched unit instruction is accomplished by adding NOPs to the unit instruction.

According to a further aspect of the present invention, a digital data processing system comprises a program bus for transferring a unit instruction or a multi instruction consisting of two or more unit instructions, at least two program memories connected with the program bus and having different bit-widths, a processor core for executing the unit or multi instruction fetched from the program memories, and a memory interface circuit for transferring the address of one of the program memories accessed by the processor core to the corresponding program memory and supplying the information on the number of the effective unit instructions contained in the unit or multi instruction generated from the corresponding program memory to the processor core, whereby the processor core selectively executes the effective instructions based on the information. The information on the number of the effective unit instructions is based on the bit number of the instruction stored in the corresponding memory and the set state of the lower N bits of the address. The unit instruction preferably contains one end bit to indicate the final one of the unit instructions included in the multi instruction. Preferably, the processor core recognizes the final unit instruction by judging the set state of the end bit of each unit instruction included in the multi instruction to execute the multi instruction.

According to a still further aspect of the present invention, a data processor having an embedded memory comprises in a single chip a first program bus for transferring a multi instruction consisting of two or more unit instructions, a second program bus for receiving a unit instruction from an external memory, an internal program memory connected with the first program bus for storing the multi instruction, a processor core for executing the unit or multi instruction fetched, and a memory interface circuit for transferring the address of the internal or external program memory accessed by the processor core to the corresponding program memory and supplying information on the number of the effective unit instructions contained in the unit or multi instruction generated from the corresponding program memory to the processor core, whereby the processor core selectively executes the effective instructions based on the information. The external and internal program memories have different bits widths. The information on the number of the effective unit instructions is preferably based on the bit number of the instruction stored in the corresponding memory and the set state of the lower N (=Natural Number) bits of the address.

According to a yet further aspect of the present invention, a digital data processing system comprises a first and a second data bus for transferring data, a first and a second address bus for transferring addresses, a first data memory connected with the first data and address buses, a second data memory connected with the second data and address buses, and a processor core for writing and reading data in and out from the first and second data memories. The first and second data memories have different bits widths.

The present invention will now described more specifically with reference to the drawings attached only by way of examples.

BRIEF DESCRIPTION OF THE ATTACHED DRAWINGS

FIG. 9 is a table for illustrating the VALID bit structure generated by the memory interface as shown in FIG. 7;

FIG. 11 is a diagram for illustrating the generation of the VALID bits when the memory interface receives the address of the 32 bit program memory region;

FIG. 12 is a diagram for illustrating the generation of the VALID bits when the memory interface receives the address of the 64 bit program memory region;

FIGS. 16A to 16C are diagrams for illustrating the sequence of fetching the instructions;

DETAILED DESCRIPTION OF THE PREFERRED EMBODIMENTS

Figure 1:
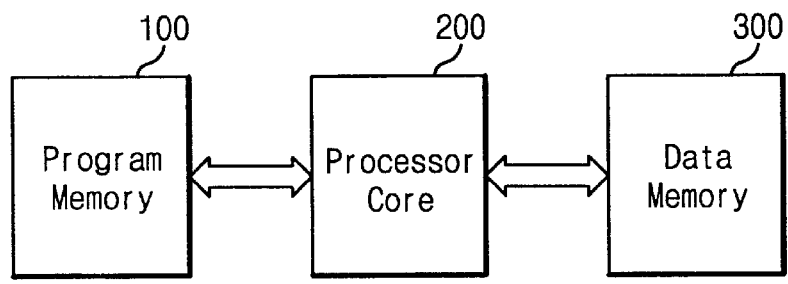
FIG. 1 is a block diagram for illustrating the structure of the inventive data processing system.

The inventive data processing system is based on the Harvard architecture, which separates the program memory 100 and data memory 300, as shown in FIG. 1. The system supports a unit instruction of a given bit-width and a multi instruction or instruction set consisting of multiple unit instructions. Especially, the program memory 100 consists of memories of various bit-widths for more effective application. The processor core 200 performs various mathematical operations and control operations by executing the instructions. The processor core 200 performs both single word instructions, as used in a processor such as a MCU, and multi word instructions such as a VLIW. Hence, the data processing system may perform both the control function of a MCU, and the high speed data processing function of a DSP.

EXAMPLE 1

Figure 2:
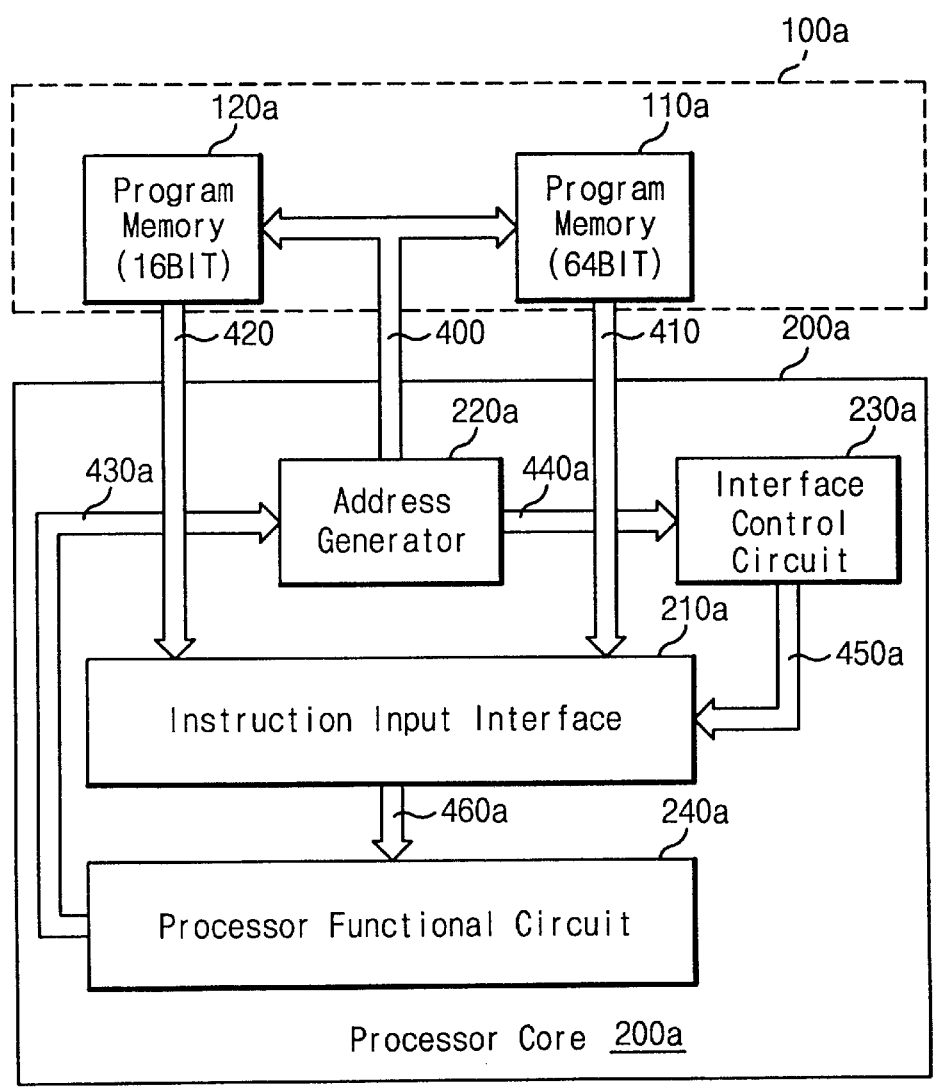
FIG. 2 is a block diagram for illustrating the circuit of a data processing system according to an embodiment of the present invention.

Referring to FIG. 2, the data processing system according to the first embodiment of the present invention has a program memory device 100a consisting of a program memory 110a of 64 bit width and a program memory 120a of 16 bit width. The instructions stored in the program memory device 100a are fetched by the processor core 200a. Provided between the 64 bit program memory 110a and the processor core 200a is a program bus 410 of 64 bit width, while providing a program bus 420 of 16 bit width between the 16 bit program memory 120a and the processor core 200a. The processor core 200a includes an instruction input interface 210a, an address generator 220a, an interface control circuit 230a, and a processor functional circuit 240a.

Figure 3:
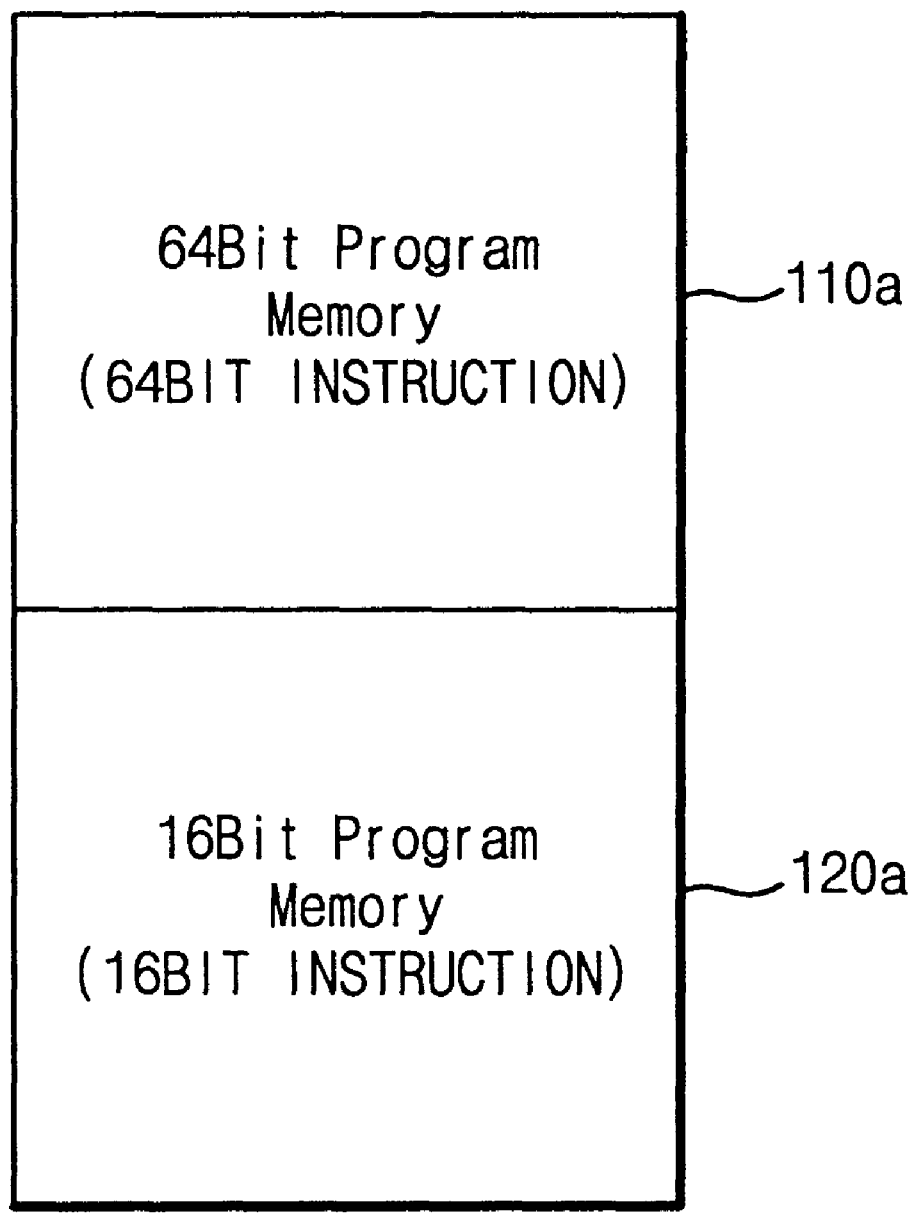
FIG. 3 is a memory map for illustrating the program memory as shown in FIG. 2.

As shown in FIG. 3, the 16 bit program memory 120a of the program memory device 100a stores 16 bit unit instructions, and the 64 bit program memory 110a stores multi word instructions consisting of two or more unit instructions. For the instruction fetch operation, the address generator 220a generates an address to access the program memory device 100a to fetch a 16 or 64 bit instruction from the corresponding memory. The fetched instruction is transferred to the instruction input interface 210a. The interface control circuit 230a generates a control signal to the instruction input interface 210a according to the address.

Figure 4:
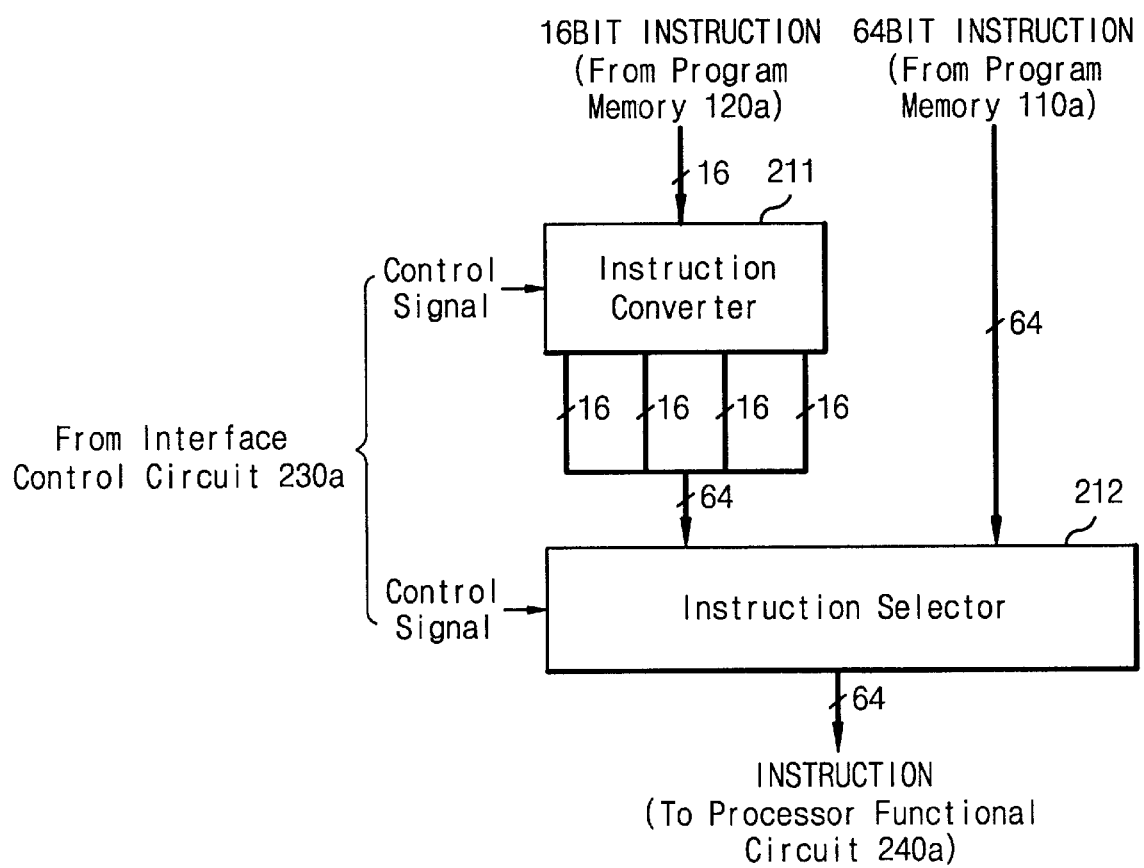
FIG. 4 is a block diagram for illustrating the instruction input interface as shown in FIG. 2.
Figure 5:
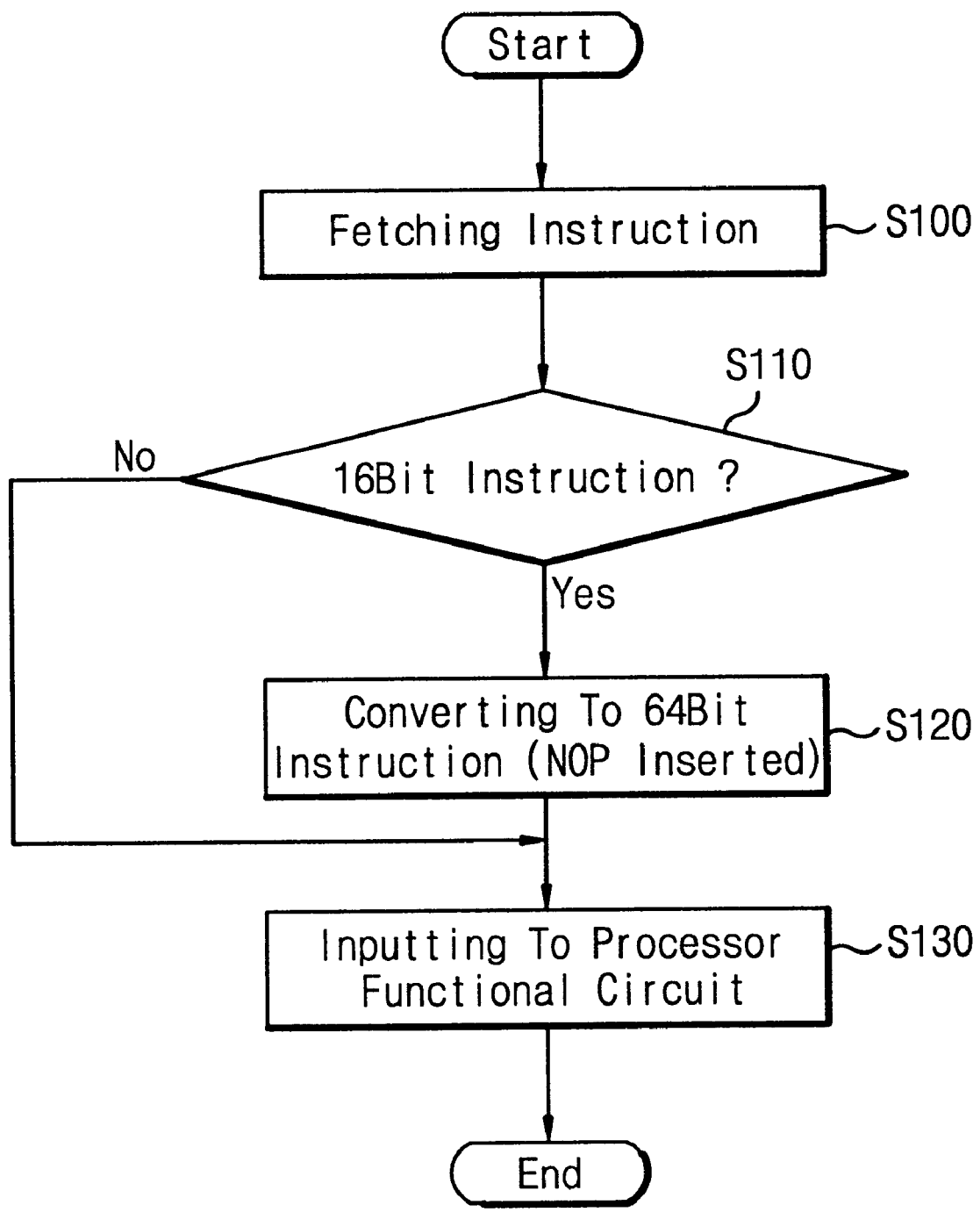
FIG. 5 is a flow chart for illustrating the operational steps of the instruction input interface as shown in FIG. 2.

The instruction input interface 210a includes an instruction converter 211 and an instruction selector 212, as shown in FIG. 4. Describing the operation of the instruction input interface 210a in reference to FIG. 5, an instruction is fetched from the program memory device 100a in step S100. Then, the fetched instruction is determined to be a 16 bit instruction or not in step S110. This is determined by the interface control circuit 230a to generate a control signal corresponding to the address to the instruction input interface 210a. The 16 bit instruction is converted into a 64 bit instruction by the instruction converter 211 in step S120. The conversion adds NOP instructions to the 16 bit instruction. In step S130, the 64 bit instruction obtained by the conversion or fetched from the 64 bit program memory 110a is delivered to the processor functional circuit 240a. The conversion operation of the instruction converter 211 is as follows:

If a 16 bit instruction (MULT R7, R4, R5) is delivered from the 16 bit program memory 120a to the processor core 200a, the instruction converter 211 converts it into a 64 bit instruction (NOP) (MULT R7, R4, R5) (NOP) (NOP) applied to the multiplexer. Namely, the NOP instructions are respectively inserted into the upper 16 bits and the lower 32 bits of the 64 bits. Hence, the 16 bit instruction fetched from the 16 bit program memory is converted into the 64 bit instruction, which is the same width of the conventional VLIW instruction. In the present embodiment, the significant instruction is placed in the upper second word, but the position may be determined according to the properties of the instructions. For example, ALU related instructions are put in the upper first word, multiplier related instructions in the upper second word, etc.

As described above, the conventional data processing system employing the VLIW instruction usually produces a large sized program because the NOP instructions must be included in the 64 bit instruction. Then, the size of the program memory must be increased with the program size, thus considerably wasting memory. Such wasting of memory is prevented by the inventive data processing system. In the present embodiment, the 16 bit unit instruction is stored into the 16 bit program memory 120a, and the 64 bit instruction into the 64 bit program memory 110a. Namely, the program routine for high speed data operation, which is in a repeated loop, is stored into the 64 bit program memory 110a, and the other routines for controlling into the 16 bit program memory 120a.

Figure 6:
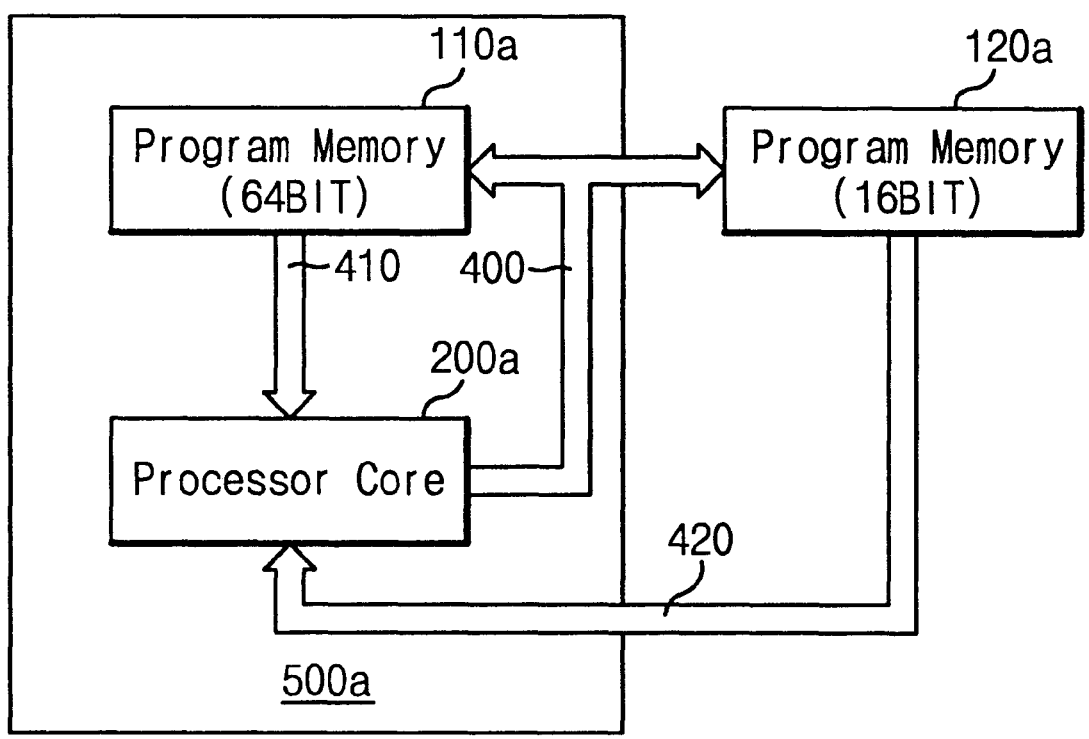
FIG. 6 is a block diagram for illustrating the inventive data processing system made of a processor with an embedded memory.

The data processing system according to the present embodiment may be constructed of a processor embedded with a memory, as shown in FIG. 6. The processor 500a has a 64 bit program memory 110a connected by a 64 bit program bus 410 with the processor core 200a. A 16 bit program memory 120a is externally connected by a 16 bit program bus 420 with the processor core 200a of the processor 500a. Of course, the program routines for high speed data operation are stored into the 64 bit program memory 110a, and the program routines for controlling into the external 16 bit program memory 120a. Thus, the number of the pins for connecting the processor with the external 16 bit program bus is considerably reduced, decreasing the production cost. The bit widths of the program memories may be selectively used according to the applications in addition to the present 16 and 64 bit widths. The interface control circuit 230a is designed to generate a proper control signal according to the setting of the program memory map. The data memory 300 will be described in reference to the second embodiment of the present invention, applied to the first and second embodiments in the same way.

EXAMPLE 2

Figure 7:
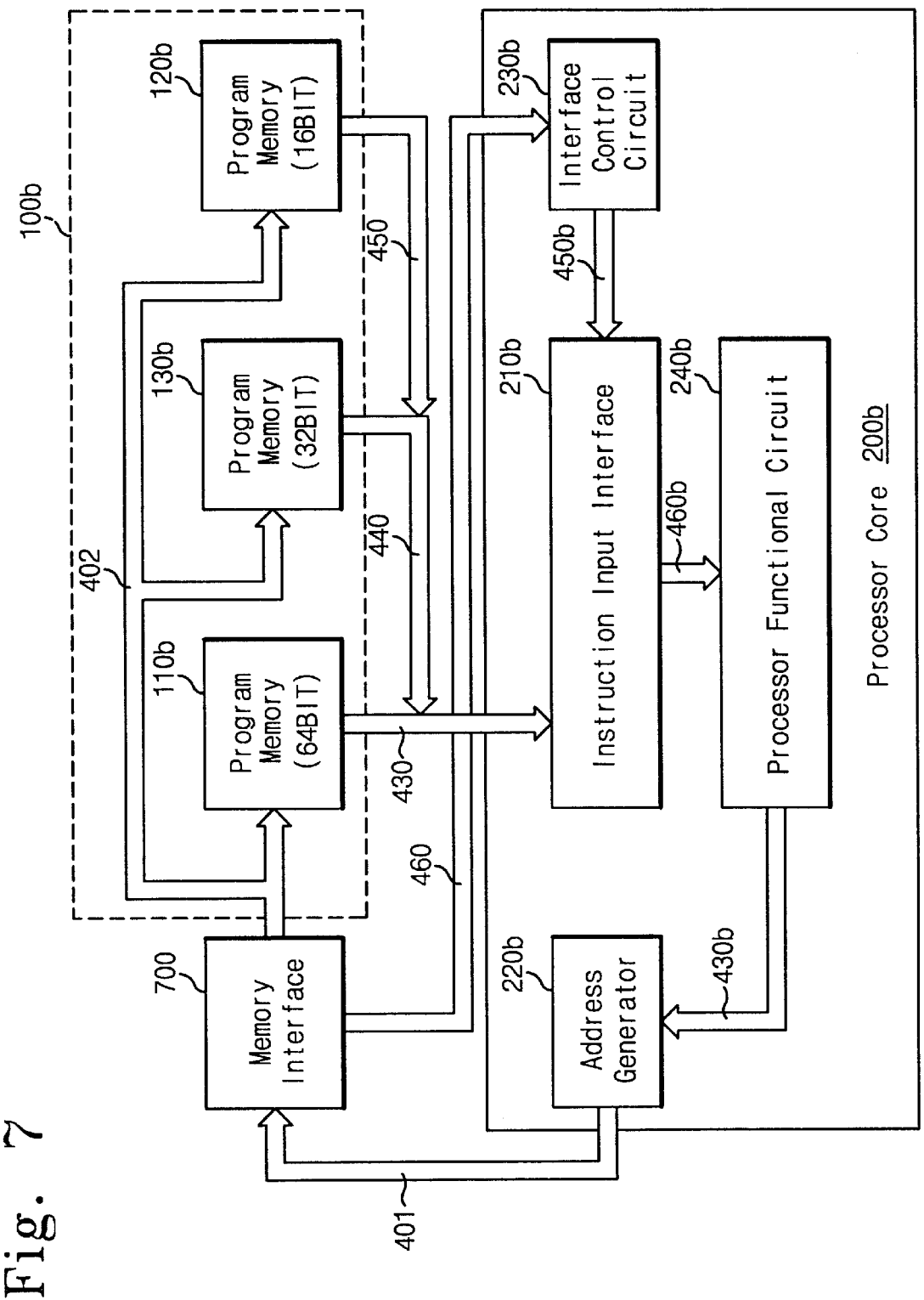
FIG. 7 is a block diagram for illustrating the circuit of a data processing system according to a second embodiment of the present invention.

Describing the second embodiment in reference to FIGS. 7 to 20, the data processing system comprises a program memory device 100b, a memory interface 700, and a processor core 200b, as shown in FIG. 7. The program memory device 100b consists of a 64 bit program memory 110b, a 32 bit program memory 130b and a 16 bit program memory 120b connected with their respective program buses 430, 440, 450, which are unified into the largest 64 bit program bus 430 connected with the processor core 200b. The processor core 200b includes an instruction input interface 210b, an address generator 220b, an interface control circuit 230b and a processor functional circuit 240b.

Figure 8:
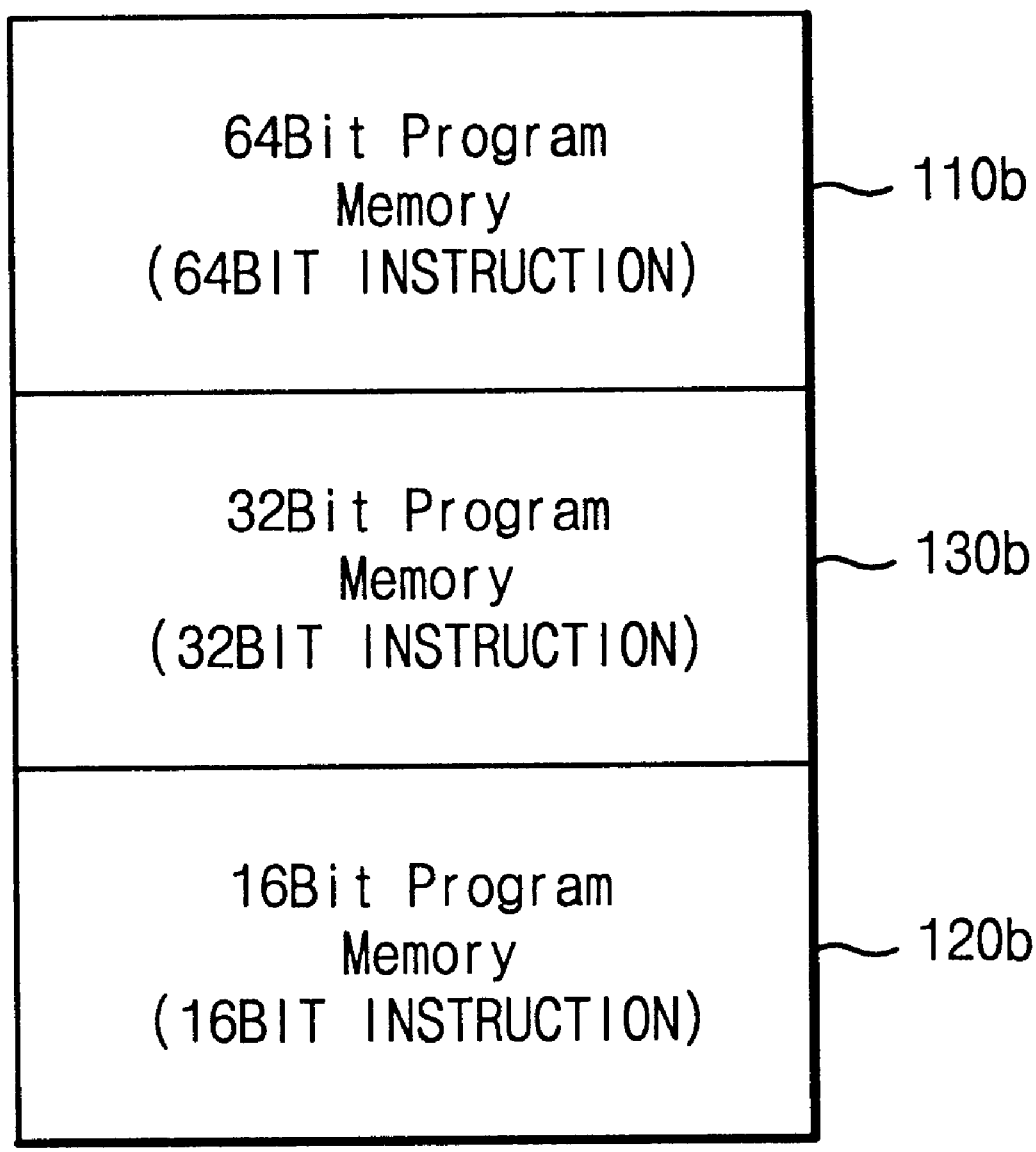
FIG. 8 is a memory map of the program memory as shown in FIG. 7.

Referring to FIG. 8 for illustrating the map of the program memory 100b, the 16 bit unit instruction is stored into the 16 bit program memory 120b, the 32 bit instruction containing one or two of the unit instructions into the 32 bit program memory 130b, and the 64 bit multi word instruction containing up to four unit instructions into the 64 bit program memory 110b.

Figure 10:
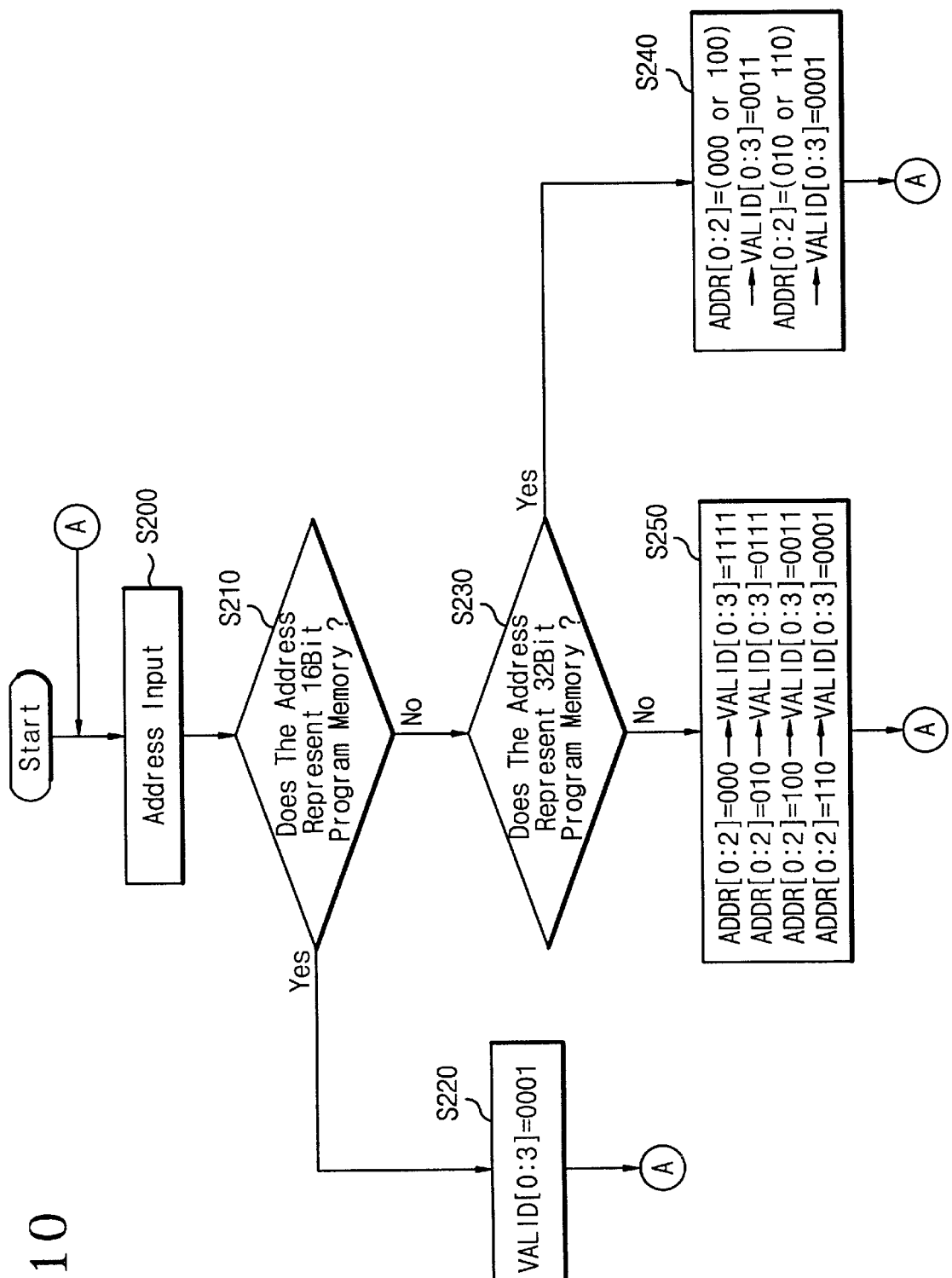
FIG. 10 is a flow chart for illustrating the operational steps of the memory interface as shown in FIG. 7.

The memory interface 700 receives an address from the processor core 200b to generate a 4 valid bits signal VALID, which provides the processor core 200b with the information on the instruction generated from the program memory 100b according to the address. FIG. 9 shows the instructions corresponding to the valid bits VALID generated from the memory interface 700. The valid bits VALID are determined according to the address generated from the processor core 200b. Namely, the lower 3 bits ADDR[0:2] of the address (in byte) representing the program memory determines the valid bits VALID, which are generated from the memory interface through the steps as shown in FIG. 10. In step S200, the memory interface 700 receives an address from the processor core 200b. Then, it determines in step S210 whether the address represents the 16 bit program memory. If the address represents the 16 bit program memory, it branches to step S220 to generate VALID[0:3]=0001. Or otherwise, it proceeds to step S230 to determine whether the address represents the 32 bit program memory. This being the case, it branches to step S240 to generate the corresponding valid bits VALID according to the lower 3 bits ADDR[0:2] of the address, as shown in FIG. 9. Otherwise, it proceeds to step S250 to likewise generate the corresponding valid bits VALID according to the lower 3 bits ADDR[0:2] of the address, as shown in FIG. 9.

For example, referring to FIG. 11, if the address (in byte) of the 32 bit program memory is inputted to the memory interface 700 with the lower two bits of the address ADDR [0:1]=00 (ADDR[0:2]=000 OR 100), the valid bits VALID [0:3]=0011 are generated. The 32 bit program memory 130b generates a 32 bit data, and if the lower two bits of the accessed address (in byte) ADDR[0:1]=00, the instruction of the next address (the upper bits being the same and the lower two bits ADDR[0:1]=10) is also generated together with the instruction of the present address. The second instruction may be executed along with the first instruction, or later, or flushed to erase the stored content. On the other hand, if the address of the 32 bit program memory is inputted to the memory interface 700 with the lower two bits of the address ADDR[0:1]=10 (ADDR[0:2]=010 OR 110), a single instruction is only valid to generate the valid bits VALID[0:3]= 0001. Hence, the processor core 200b does not execute the instruction of the previous address (the upper two bits being the same and the lower two bits being 00).

Referring to FIG. 12, receiving an address (in byte) of the 64 bit program memory, the memory interface 700 generates the valid bits VALID corresponding to the lower three bits ADDR[0:2] of the address. Of course, the 64 bit program memory 110b generates an instruction of 64 bit data delivered to the processor core 200b. Likewise, the unit instructions of the inputted 64 bit instruction may be executed at once, or later, or flushed. Thus, the data processing system of the present embodiment supports the multi word instruction such as VLIW. The system may execute the multiple instructions simultaneously, or only a single instruction.

Moreover, it is not necessary to insert NOP as in the conventional VLIW method.

Figure 13:
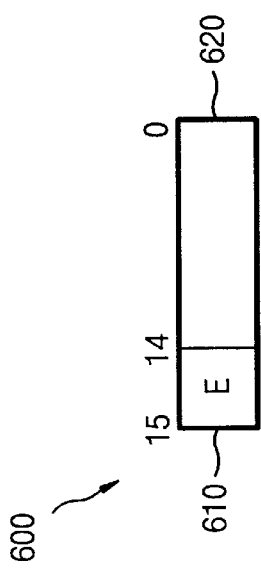
FIG. 13 is a diagram for illustrating the structure of a unit instruction according to a preferred embodiment of the present invention.

Preferably, the instruction set is built on the basis of 16 bit unit instruction 600, as shown in FIG. 13. The most significant bit MSB of the unit instruction 600 is the end bit END 610 to represent the last instruction of the multi word instruction. Hence, the bits used for the significant instruction are the remaining 15 bits 620. Two or more unit instructions 600 constitute the multi word instruction.

Figure 14:
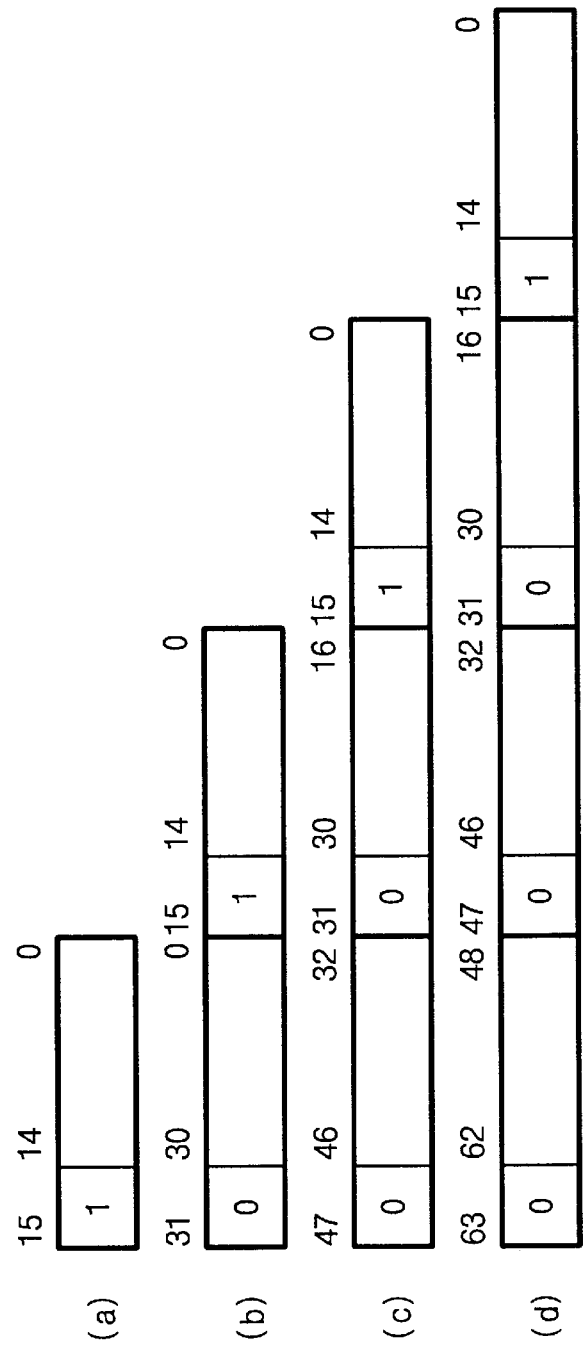
FIG. 14 is a diagram for illustrating an example of a multi word instruction consisting of two or more unit instructions as shown in FIG. 13.

Referring to FIG. 14, (a) represents the 16 bit unit instruction, (b) 32 bit two word instruction, (c) 48 bit three word instruction, and (d) 64 bit four word instruction. The end bit of the last unit instruction in (b) to (d) instructions is set with '1', indicating the last unit instruction of the multi word instruction. Even if there is used a single unit instruction as in the case of (a), the end bit END is set with '1'. Thus, executing several instructions at once, the end bit END of the last instruction represents '1' and the other end bits 0.

The end bit 610 is set according to the scheduling information when compiling, so that one bit of the 16 bit instruction has no valid information, generating an overhead of one sixteenth. But, in the practical instruction set, not all of the instructions waste the end bit. For example, two 16 bit memory accesses are made to form a single instruction, so that a single load/store instruction may be performed at one cycle. In addition, the load/store instruction is put in the last position so that its end bit may be always set with 0. Thus, the instruction with the end bit of 1 is set apart from the instruction with the end bit of 0, so that the instruction overhead due to the insertion of the scheduling information may be minimized. The end bit generating less than 5% overhead compared to the conventional RISC processor, the present processor supports variable instructions minimizing the code size. It may also execute several instructions simultaneously with a simple instruction set, thus providing high speed data operation as in the conventional DSP application. In addition, the hardware scheduling part is not necessary compared to the conventional superscalar method, giving advantages in cost and power consumption. Further, the bit-width of the program bus (for the external program memory) may be reduced, and a single end bit per a unit instruction represents the scheduling information without inserting any NOP instruction.

Figure 15:
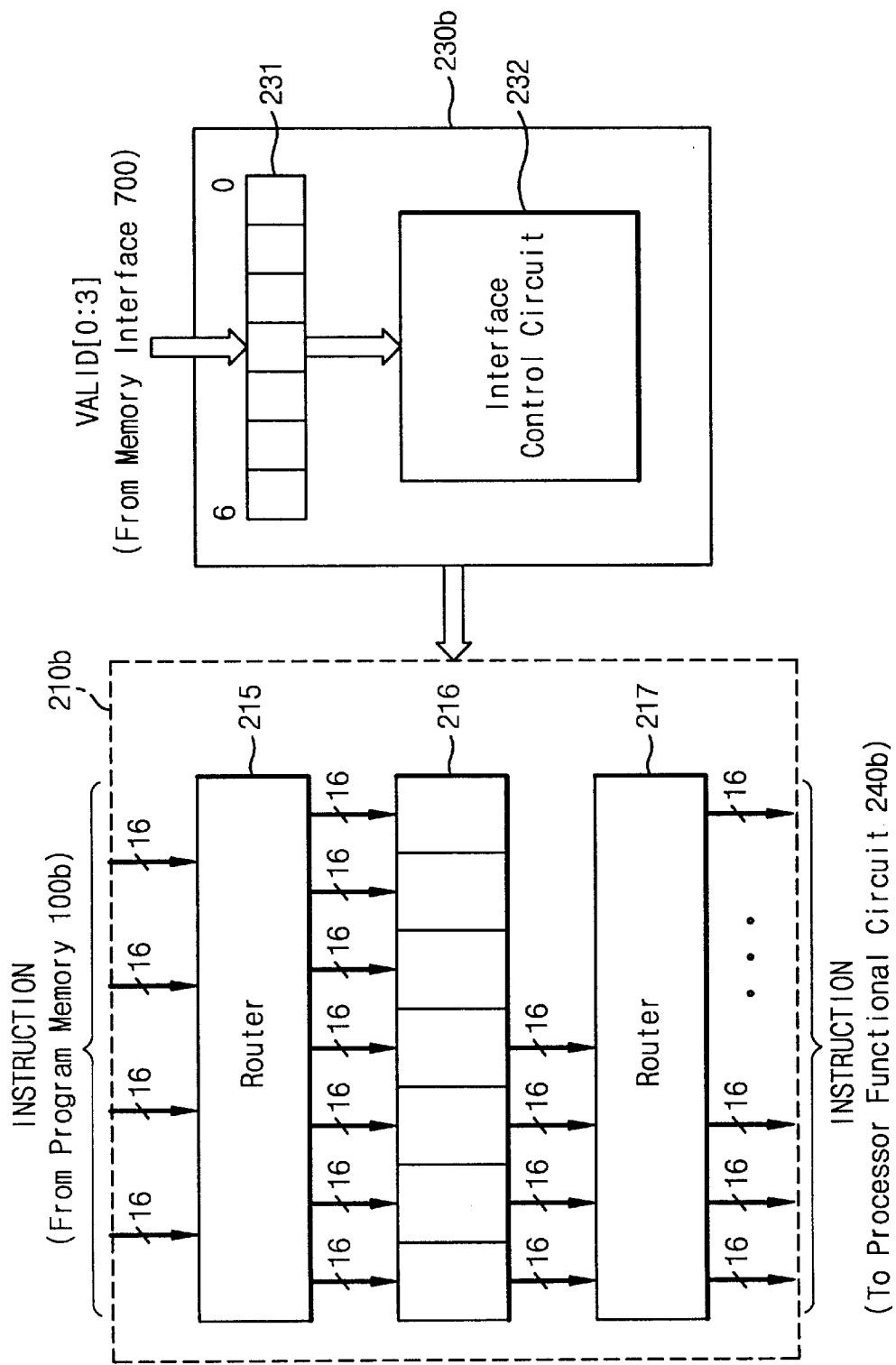
FIG. 15 is a block diagram for illustrating the instruction input interface and interface control circuit as shown in FIG. 7.

Referring again to FIG. 7, the processor core 200b executes the instructions of the above structure including the end bit 610, which is more specifically described in connection with FIG. 15. The instruction input interface circuit 210b comprises a first router 215, an instruction register 216 for storing the instructions inputted through the first router 215, and a second router 217 for delivering the instruction to execute from the register 216 to the processor functional circuit 240b. The interface control circuit 230b comprises a register 231 for storing the valid bits VALID and an interface control circuit 232.

The first router 215 is connected with the 64 bit program bus 430 in FIG. 7 to deliver the instruction from the program memory 100b to the instruction register 216. The first router 215 receives the instruction with maximum length of 64 bits. The instruction register 216 may store up to 7 unit instructions, so that the next instructions may be fetched before completing the execution of the presently fetched instructions. The instructions stored in the instruction register 216 are transferred through the second router 217 to the respective parts of the processor functional circuit 240b, for example, ALU1, ALU2, MULTIPLIER, REGISTER . . . .

The first router 215 routes the fetched instruction to an empty region of the instruction register 216. The second router 217 routes the received instruction to the respective part of the processor functional circuit 240b. The instruction register 216 flushes the executed instruction through a shifting operation to arrange the next instruction to be transferred to the second router 217. The shifting operation of the instruction register 216 is controlled by the interface control circuit 230b.

The register 231 provided in the interface control circuit 230b stores the valid bits VALID from the memory interface 700, performing a shifting operation in the same way as the instruction register 216. The interface control circuit generates a control signal delivered to the instruction input interface 210 according to the setting of the register 231. Upon reset, the valid bits VALID are all 0 because there is no fetched instruction. Then starting the fetch operation, the fetched instructions are aligned toward the left of the instruction register 216. The unit instructions of the aligned instructions, of which the valid bits are 1 and the end bits 1, are delivered through the second router 217 to the respective parts of the processor functional circuit, executed all at once. The instruction register 216 is realigned through shifting according to the set state of the valid bits VALID after executing the instructions. FIG. 16 schematically shows the sequence of fetching the instructions.

Figure 16A:
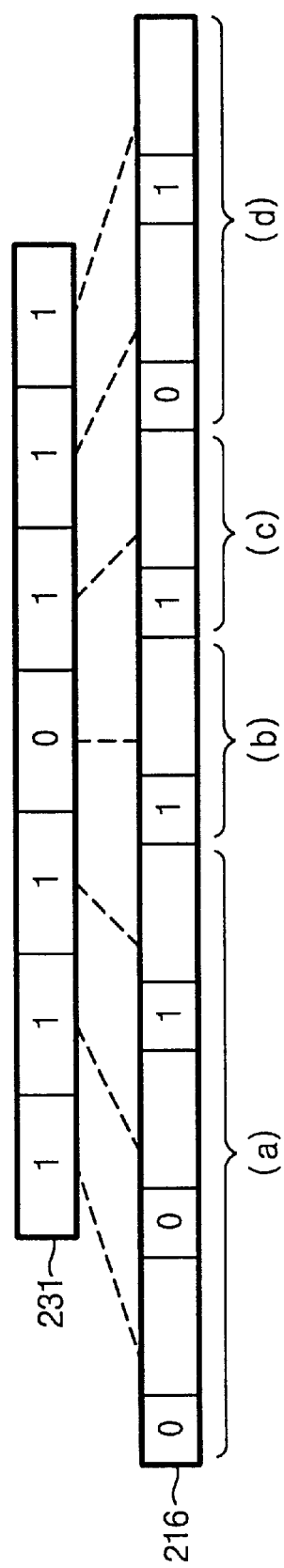
Figure 16B:
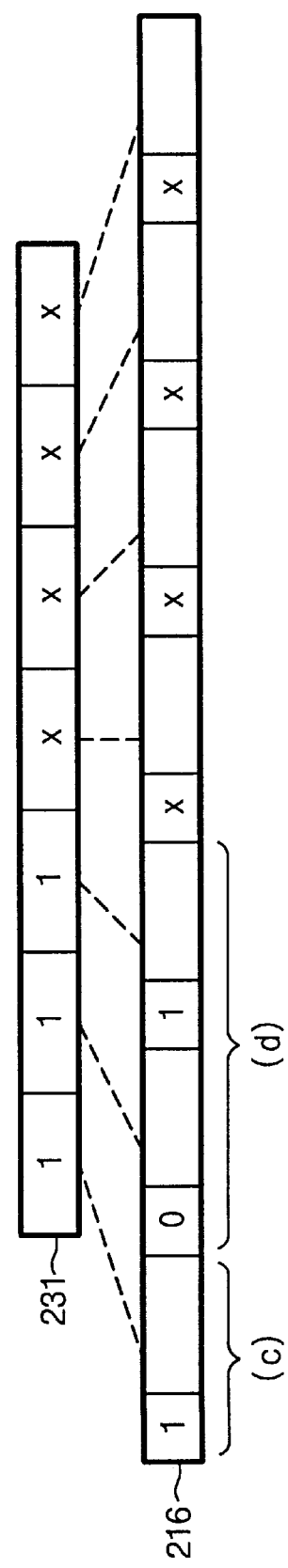

As shown in FIG. 16A, when the unit instructions are stored in the instruction register 216, and the corresponding valid bits VALID in the register 231, firstly executed is the three word instruction (a) consisting of three unit instructions. Then, performing the shifting operation, the instruction (b) is flushed without execution because the valid bit VALID is 0. Hence, the instruction register 216 is set as shown in FIG. 16B after shifting. Subsequently executing the instruction (c), the instruction register 216 is shifted as shown in FIG. 16C.

Thus, if there are two or more instructions with the end bit of 1, it is not necessary to fetch the next instruction because of the instruction to execute at the next cycle. Or otherwise, the next instruction is fetched. The executed instructions are flushed by the shifting operation of the instruction register 216. Then, the unexecuted instructions are shifted toward the left while the register 231 storing the corresponding valid bits VALID performs the shifting operation. The next fetched instructions are transferred through the first router 215 to the empty regions of the instruction register 216, which have the valid bits VALID set with 0. When shifting, the instructions with the valid bits VALID set with 1 are shifted aligned toward the left, disregarding the instructions with the valid bits VALID set with 0. When the address is not aligned or the program memory 100b has a bit-width of insufficient size, the valid bits VALID are set with 0.

Meanwhile, the processor functional circuit 240b is provided with a plurality of ALUs (not shown), which may be used by a multi word instruction. In this case, it is designed that the first ALU instruction is executed by the first ALU, and the second ALU instruction by the second ALU. In addition, the first ALU is designed to execute all of the ALU instructions, and the second ALU to execute the limited ALU instructions. Such scheduling is made in compiling.

Figure 17:
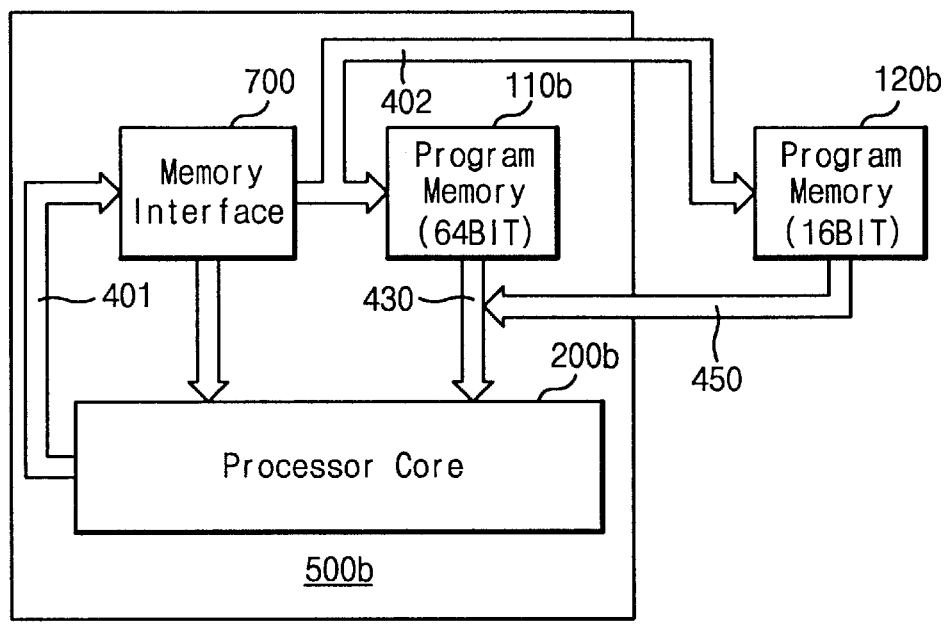
FIG. 17 is a block diagram for illustrating a processor with an embedded memory constituting the data processing system according to the second embodiment of the present invention.

The data processing system of the second embodiment may be constructed of a processor embedded with a memory, as shown in FIG. 17. The processor 500b is provided with a memory interface 700, a 64 bit program memory 110b, and a processor core 200b connected through a 64 bit program bus 430 to the 64 bit program memory 110b. In addition, the processor 500b is externally connected through a 16 bit program bus 450 to a 16 bit program memory 120b. The 64 bit program memory 110b stores the routines for high speed data operation, and the external 16 bit program the routines for controlling. Thus, the internal program bus is made to have 64 bits, and the external program bus to have 16 bits. This reduces the number of the chip pins for connecting with the external program bus, thereby decreasing the production cost of the chip. The memories may have various bit widths according to the applications. The structure of the data bus of the present embodiment is described with reference to FIGS. 18 to 20.

Figure 18:
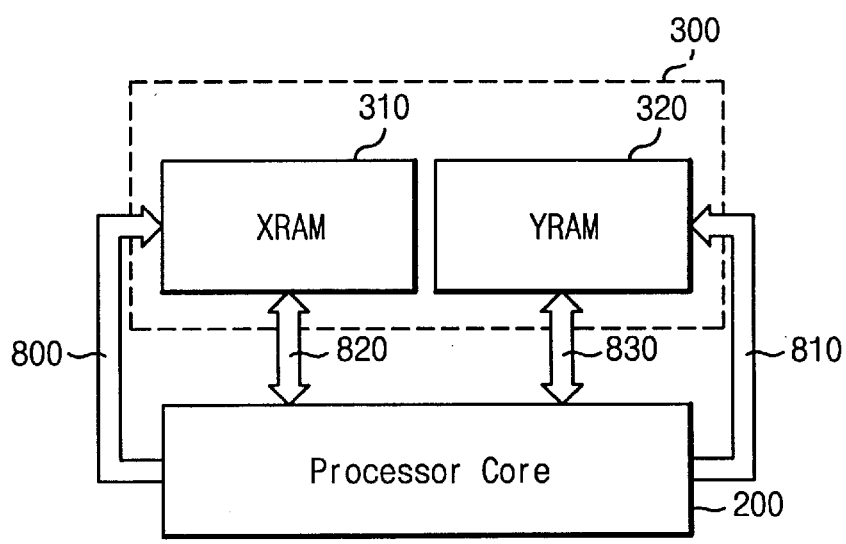
FIG. 18 is a block diagram for illustrating the structure of the data bus of the data processing system according to the second embodiment of the present invention.

Referring to FIG. 18, the processor core 200 writes or reads data into or from the data memory device 300 consisting of two parallel memories XRAM 310 and YRAM 320, which may be separately accessed. The processor core 200 is connected with both XRAM 310 and YRAM 320 through first and second data buses 820 and 830 for data transfer and first and second address buses 800 and 810 for address transfer. Of course, the processor core 200 may simultaneously or separately access the XRAM 310 and YRAM 820 by generating the respective addresses through the first and second address buses 800 and 810.

Figure 19:
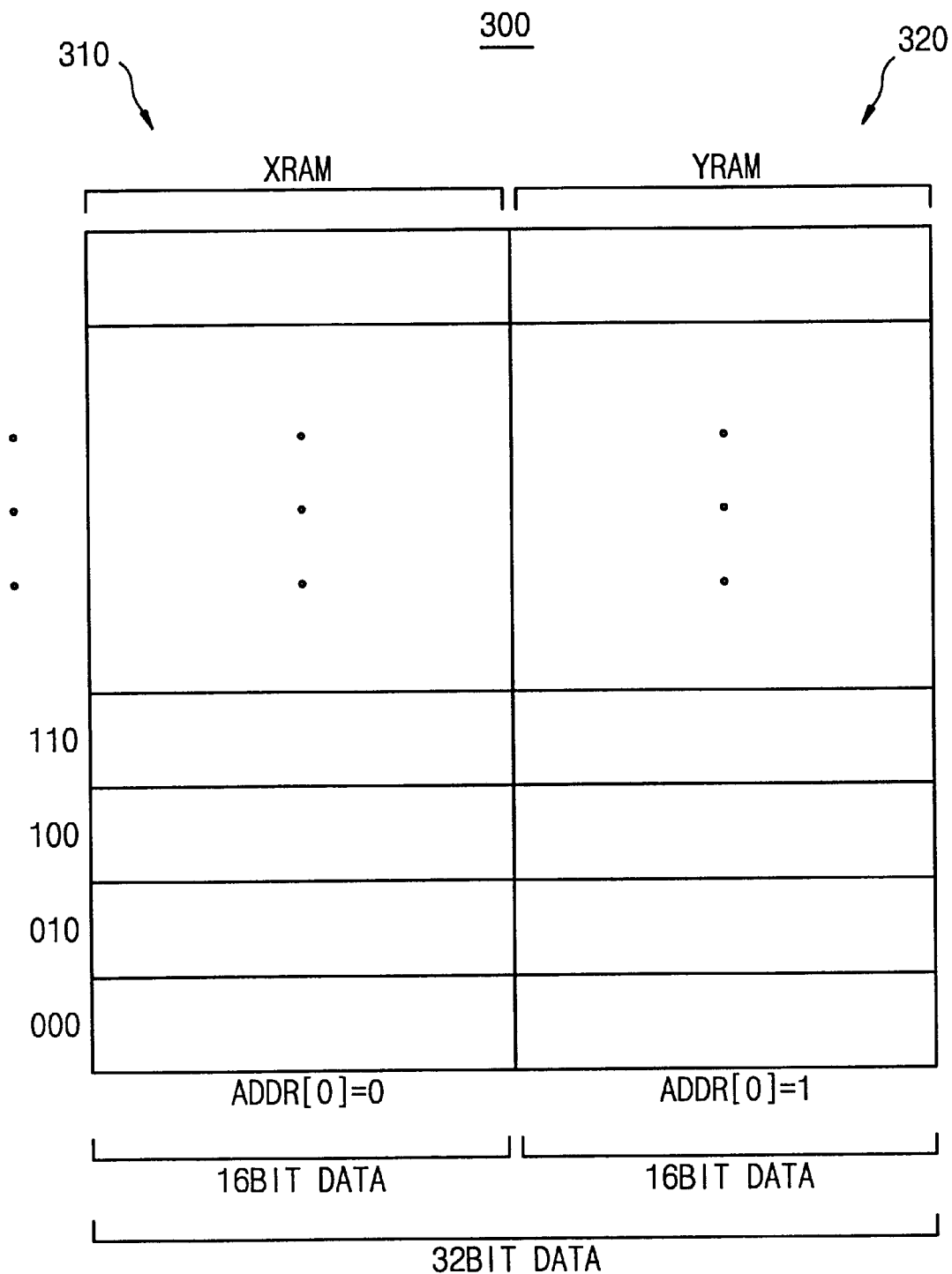
FIG. 19 is a memory map of the XRAM and YRAM as shown in FIG. 18, consisting of 16 bit-width memories.

The data memory device 300 may comprise two memories with 16 bit widths or four memories with 8 bit widths. FIG. 19 schematically shows the memory map of the XRAM 310 and YRAM 320 employing memories with 16 bit widths, and FIG. 20 with 8 bit widths.

In the case of employing two memories with 16 bit widths as shown in FIG. 19, the memories are accessed by using the address of the lowermost 1 bit ADDR[0]. For example, the XRAM 310 is allocated with the address of the lowermost bit ADDR[0]=0, i.e., the even numbered address, and the YRAM 320 with the lowermost bit ADDR[0]=1, i.e., the odd numbered address. These are used as the selection signals to select the XRAM 310 and YRAM 320. In this way, the XRAM 310 and YRAM 320 may be separately or simultaneously accessed to write or read 16 or 32 bit data. When writing or reading the 32 bit data, the addresses of the lowermost bits ADDR[0]=0 and ADDR[0]=1 are respectively generated through the first and second address buses 800 and 810.

Figure 20:
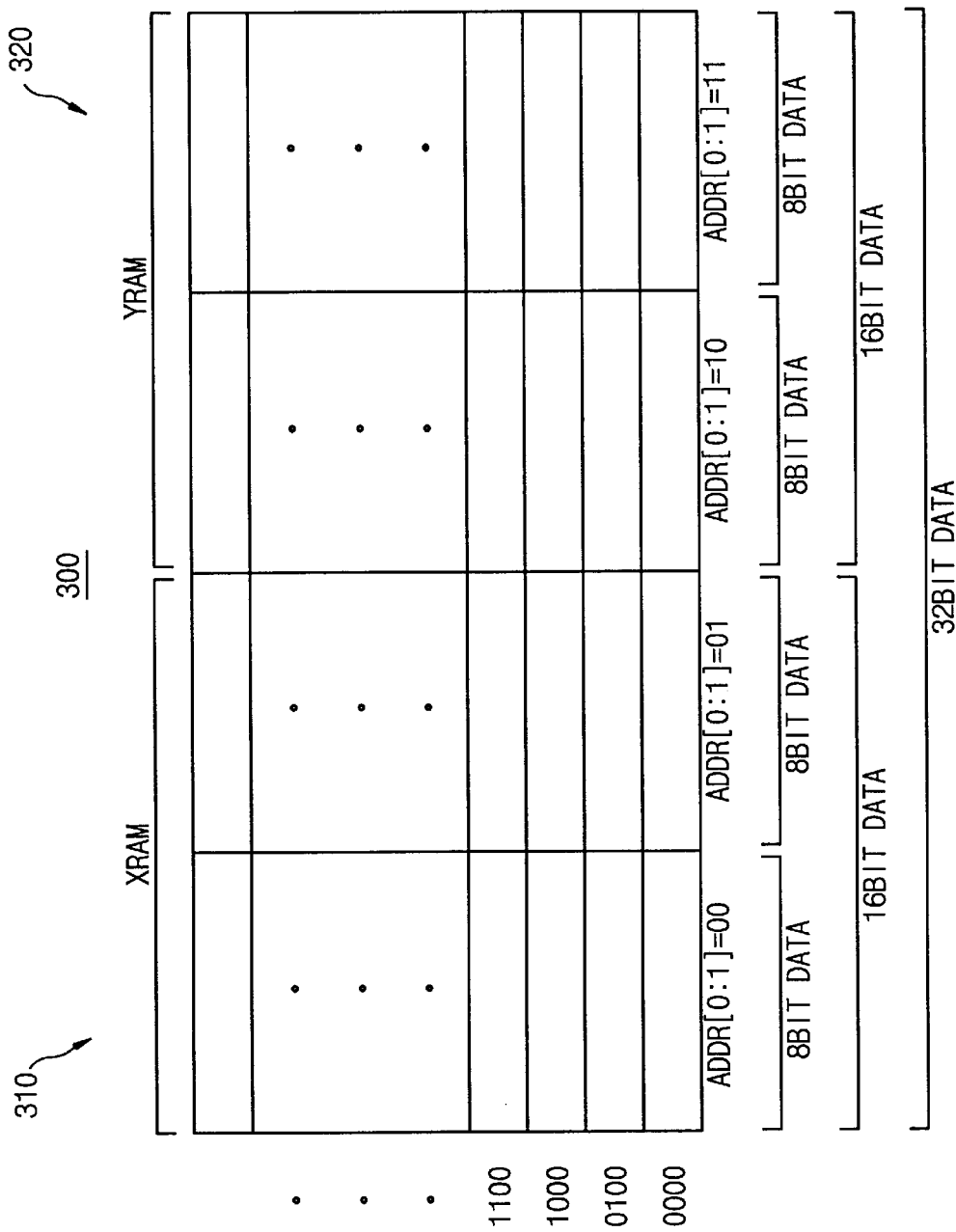
FIG. 20 is a memory map of the XRAM and YRAM as shown in FIG. 18, consisting of 8 bit-width memories.

In the case of employing four memories with 8 bit widths as shown in FIG. 20, each of the XRAM 310 and YRAM 320 is composed of two 8 bit width memories. The four memories may be separately accessed by using the address of the lowermost bits ADDR[0:1]. For example, the memories of the XRAM 310 are respectively allocated with the addresses of the lowermost two bits ADDR[0:1]=00 and ADDR[0:1]=01, and the memories of the YRAM 320 with the lowermost two bits ADDR[0:1]=10 and ADDR[0:1]=11. These are used as the selection signals to select the XRAM 310 and YRAM 320. In this way, the XRAM 310 and YRAM 320 may be separately or simultaneously accessed to write or read 8 and 16 or 32 bit data. When writing or reading the 32 bit data, the address of the lowermost two bits ADDR[0:1]=00 is generated through the first address bus 800, and ADDR[0:1]=10 through the second address bus 810. In this case, if a part of the data memory is allocated for a 32 bit data region, and the other for a 16 bit data region, the data memory may be more effectively used. Namely, the 32 bit data region may be exclusively used by the 32 bit data as handled in the MCU application, and the 16 bit data region by the 16 bit data as handled in the DSP application.

Thus, according to the present invention, there is provided means for executing several instructions at one cycle without the hardware overhead as in the conventional superscalar method. In addition, the size of the program execution codes is prevented from increasing due to the insertion of NOPs as in VLIW. There is also prevented wasting of memory due to the bit-width increase thereof. A single processor may cover both functions of the conventional MCU and DSP. The present invention may be more effectively applied to a processor with an embedded memory.

What is claimed is:

1. A data processing system comprising:
   a first program memory that stores a plurality of unit instructions;
   a second program memory that stores a plurality of multi-instructions that consists of plural unit instruction;
   a first program bus, coupled to said first program memory, that transfers the unit instructions;
   a second program bus, coupled to said second program memory, that transfers the multi-instructions; and
   a processor core, coupled to said first and second program buses, that receives and executes the transferred unit instructions and the transferred multi-instructions,
   wherein said processor core including an instruction input interface circuit that adds one or more NOP (No-Operation) instructions to each of the transferred unit instructions to convert the transferred unit instructions into converted multi-instructions;
   wherein said first and second program memories have different bit-widths; and
   wherein the unit instruction contains an end bit indicative of whether the unit instruction is a final unit instruction in a multi-instruction.

2. The data processing system of claim 1, wherein said instruction input interface circuit comprises:
   an instruction converter, coupled to said first program bus, that adds one or more of the NOP instructions to each of the transferred unit instructions to provide the converted multi-instructions; and
   an instruction selector, coupled to said second program bus and an output of said instruction converter, that selects one of the transferred multi-instructions or the converted multi-instructions.

3. A single-chip data processor comprising:
   a first program bus, coupled to an external program memory that is external of the single-chip data processor, that transfers unit instructions stored in the external program memory;
   an internal program memory, embedded within the single-chip data processor, that stores a plurality of multi-instructions;
   a second program bus, coupled to said internal program memory, that transfers the multi-instructions; and
   a processor core, coupled to said first and second program buses, that receives and executes the transferred unit instructions and the transferred multi-instructions,
   wherein said processor core including an instruction input interface circuit that adds one or more NOP (No-Operation) instructions to each of the transferred unit instructions to convert the transferred unit instructions into converted multi-instructions; and
   wherein said internal program memory has a different bit width than the external program memory.

4. The single-chip data processing system of claim 3, wherein said instruction input interface circuit comprises:
   an instruction converter, coupled to said first program bus, that adds one or more of the NOP instructions to each of the transferred unit instructions to provide the converted multi-instructions; and
   an instruction selector, coupled to said second program bus and an output of said instruction converter, that selects one of the transferred multi-instructions or the converted multi-instructions.

5. An instruction conversion method for a data processing system including a processor core, a unit instruction program memory that stores a plurality of unit instructions and a multi-instruction program memory that stores a plurality of multi-instructions, the program memories having different bit-widths, the instruction conversion method comprising:
   accessing one of the unit instructions or one of the multi-instructions;
   determining whether the accessed instruction is a unit instruction or a multi-instruction;
   converting the accessed instruction into a converted multi-instruction and transferring the converted multi-instruction to the processor core, upon determination that the accessed instruction is a unit instruction; and
   transferring the accessed instruction to the processor core without conversion, upon determination that the accessed instruction is a multi-instruction,
   said converting of the accessed instruction comprises adding one or more NOP (No-Operation) instructions to the unit instruction;
   wherein the unit instruction contains an end bit indicative of whether the unit instruction is a final unit instruction in a multi-instruction.

6. A digital data processing system comprising:
   at least two program memories that respectively have different bit-widths and that store unit instructions and multi-instructions that consist of plural unit instructions;
   a program bus, coupled to said at least two program memories, that transfers instructions as unit instructions or multi-instructions;
   a processor core that receives and executes the instructions; and
   a memory interface circuit, coupled to said at least two program memories and said processor core, that transfers to a corresponding one of said at least two program memories an address of a memory location to be accessed, supplies said processor core with information indicative of a number of unit instructions in the memory location to be accessed, and controls transfer of the instructions stored in the accessed memory location to said processor core via said program bus,
   the information indicative of a number of unit instructions in the memory location to be being determined from a set state of a lower N-bits of the address of the memory location and a bit number of the instructions stored in the memory location.

7. The digital data processing system of claim 6, wherein said processor core recognizes the final unit instruction by determining a set state of the end bit of each unit instruction included in a multi-instruction.

8. A single-chip data processor comprising:
   an internal program memory, embedded within the single-chip data processor, that stores a plurality of multi-instructions that consist of plural unit instructions;
   a first program bus, coupled to said internal program memory, that transfers the multi-instructions;

a second program bus that transfers unit instructions from an external program memory that is external of the single-chip data processor;

a processor core coupled to said first and second program buses, that receives and executes the transferred unit instructions and the transferred multi-instructions; and a memory interface circuit that transfers to said internal program memory and said external program memory an address of a memory location to be accessed by said processor core, supplies to said processor core information indicative of a number of unit instructions in the memory location to be accessed and controls transfer of the unit instructions or the multi-instructions stored in the memory location to said processor core, said processor core selectively executes the instructions in accordance with the information indicative of a number of unit instructions, the information indicative of a number of unit instructions being determined from a set state of lower N-bits of the address of the memory location and a bit number of the instructions stored in the memory location.

9. The single-chip data processor of claim 8, wherein said internal program memory and the external program memory have different bit-widths.

\* \* \* \* \*